(12) United States Patent
Itoh et al.

(10) Patent No.: US 7,532,338 B2
(45) Date of Patent: May 12, 2009

(54) IMAGE FORMING APPARATUS WITH ANOMALY DETECTION

(75) Inventors: Shingo Itoh, Komaki (JP); Takaaki Shirai, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 967 days.

(21) Appl. No.: 10/959,208

(22) Filed: Oct. 7, 2004

(65) Prior Publication Data

US 2005/0105120 A1    May 19, 2005

(30) Foreign Application Priority Data

Oct. 15, 2003    (JP)    ............... 2003-355397

(51) Int. Cl.
G06F 3/12    (2006.01)
G06F 11/30    (2006.01)

(52) U.S. Cl. ..................... 358/1.14; 358/1.15

(58) Field of Classification Search ............... 358/1.14, 358/1.1, 1.13, 1.15, 400, 401, 405, 474

See application file for complete search history.

(56) References Cited

U.S. PATENT DOCUMENTS 5,253,079 A * 10/1993 Nakatani et al. ........... 358/3.29
5,418,904 A * 5/1995 Tomiyasu et al. .......... 358/1.15
2002/0097442 A1 7/2002 Murata
2005/0003859 A1 * 1/2005 Morisaki et al. ............ 455/557

FOREIGN PATENT DOCUMENTS

| JP | A 02-198271 | 8/1990 |
| JP | A-04-092551 | 3/1992 |
| JP | A-06-197228 | 7/1994 |
| JP | A-07-221959 | 8/1995 |
| JP | B2 2758924 | 3/1998 |
| JP | A 10-294774 | 11/1998 |
| JP | A 10-304165 | 11/1998 |
| JP | A 2002-218191 | 8/2002 |

* cited by examiner

*Primary Examiner*—Gabriel I Garcia
(74) *Attorney, Agent, or Firm*—Oliff & Berridge, PLC

(57) ABSTRACT

An image forming apparatus has a receiving section that receives data regarding an image transmitted through a communication network, a storage section that stores the received data which is received by the receiving section, a converting section that reads out the received data stored in the storage section and performs a converting process of converting the received data to image data, and an image forming section that forms an image on a recording medium based on the image data which is converted by the converting section, a determining section that determines whether or not an anomaly occurs in the converting process of the converting section, and a controlling section that controls the converting section to terminate the converting process determined by the determining section that an anomaly occurs, and to perform the converting process of subsequent data if the receiving section receives the subsequent data.

19 Claims, 7 Drawing Sheets

IMAGE FORMING APPARATUS WITH ANOMALY DETECTION

BACKGROUND OF THE INVENTION

1. Field of the Invention

The present invention relates to an image forming apparatus which receives data regarding an image through a communication network, and which forms an image on a recording medium based on the received data.

2. Description of the Related Art

For example, a facsimile apparatus receives a modulation-coded data related to an image from an opposite communication apparatus while demodulating the data, converts (decodes) the received data to an image data, and prints an image onto a recording sheet on the basis of the image data obtained as a result of the conversion.

JP-A-10-304165discloses a technique for dealing with an anomaly in data reception such as that a page end signal which is to be added to a received data is corrupted due to noises or the like.

JP-A-10-304165 is referred to as a related art.

SUMMARY OF THE INVENTION

In the above facsimile apparatus, even though data reception is normally performed, an anomaly may sometimes occur from any cause in a subsequent converting process to stop the operation. As a result, a converting process is not performed on a subsequent received data and the facsimile apparatus cannot perform a printing process.

The object of the invention is to provide an image forming apparatus which can deal with a case where an anomaly occurs in a process of converting a received data that is normally received.

The invention provides an image forming apparatus having: a receiving section that receives data regarding an image transmitted through a communication network; a storage section that stores the received data received by the receiving section; a converting section that reads out the received data stored in the storage section and performs a converting process of converting the received data to image data; an image forming section that forms an image on a recording medium based on the image data converted by the converting section; a determining section that determines whether or not an anomaly occurs in the converting process of the converting section; and a controlling section that controls the converting section to terminate the converting process determined by the determining section that an anomaly occurs, and to perform a subsequent converting process of subsequent data if the receiving section receives the subsequent data.

The invention also provides an image forming apparatus, having: a communication unit that receives data transmitted through a communication network; a memory that stores the data received by the communication unit; a controller that reads out the data stored in the memory and performs a converting process of converting the data to an image data; and an image forming section that forms an image on a recording medium based on the image data converted by the controller, wherein the controller further determines whether or not an anomaly occurs during the converting process, terminates the converting process determined that an anomaly occurs, and performs a subsequent converting process of subsequent data if the communication unit receives the subsequent data.

In the invention, "the communication network" includes, for example, a telephone line, the Internet, and a LAN (Local Area Network).

"the receiving section" includes both means of the wired type and that of the wireless type.

"the image" includes a character image, a picture image, a photo image, and the like.

"the recording medium" includes a display screen of a displaying section, a printing sheet, and the like.

Thus, when an anomaly occurs in the process of converting the received data, the converting process in which the anomaly occurs is ended, and the converting process is performed while the object of the converting process is switched to another subsequent received data. Therefore, it is possible to avoid a situation where subsequent received data are not processed because of an anomaly in a process of converting the previous received data.

DETAILED DESCRIPTION OF THE PREFERRED EMBODIMENTS

Embodiment 1

Embodiment 1 of the invention will be described with reference to FIGS. 1 to 6.

An image forming apparatus of the embodiment is a facsimile apparatus 10 which is a multi-function peripheral apparatus having various functions such as a facsimile function, a scanner function, and a copy function.

1. External Configuration of the Facsimile Apparatus

Figure 1:
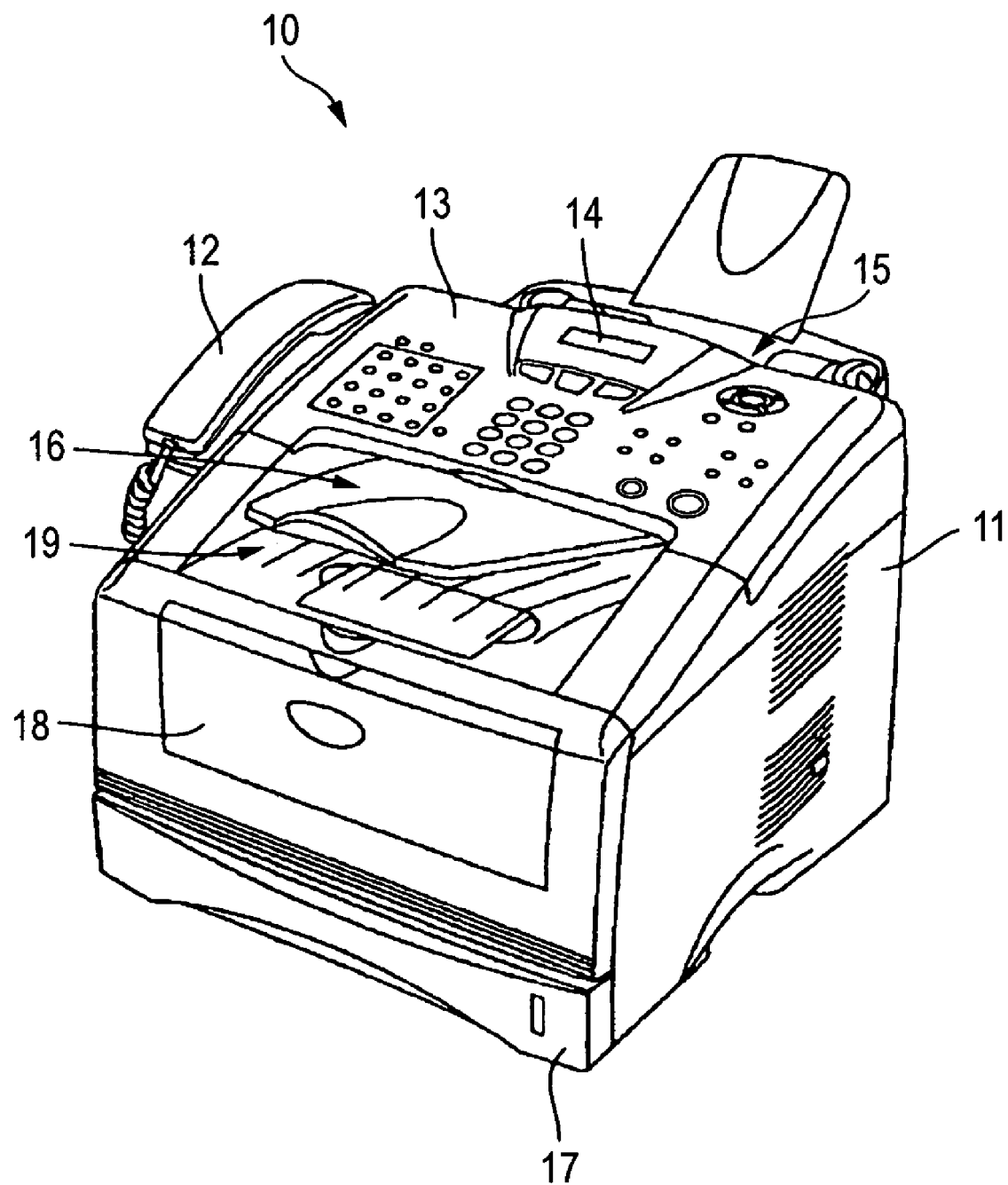
FIG. 1 is a perspective view of a facsimile apparatus of Embodiment 1 of the invention.

FIG. 1 is an overall view showing the appearance of the facsimile apparatus 10. As shown in the figure, a handset 12 is disposed on a side portion of a main unit 11 of the facsimile apparatus 10. An operation panel 13 comprising plural buttons such as dial buttons is disposed in a rear portion of the upper face of the main unit 11. An LCD 14 serving as displaying section on which various information are to be displayed is placed in a center rear end side of the operation panel 13.

An original insertion port 15 is disposed in rear of the operation panel 13. An original which is to be transmitted to an opposite communication apparatus in the case of the facsimile function, or a copy original which is to be copied in the case of the copy function is inserted into the original insertion port 15 while the surface to be read is downward directed. The inserted original is subjected to a reading process to form an image data by a scanner 28 which will be described later, and then discharged from an original discharge port 16 which is disposed in a front portion of the upper face of the main unit 11.

A recording sheet cassette 17 which is opened and closed in a drawer-like manner, and which can stackingly house recording sheets (printing sheets, or recording media) is disposed in a lower portion of the front face of the main unit 11. In the case of the printer function, a recording sheet is supplied from the recording sheet cassette 17, subjected to a printing process by a printer 31 which will be described later, and then discharged from a recording sheet discharge port 19 disposed in the front face of the main unit 11. A tray 18 is opened and closed about the lower end, and plural recording sheets can be stacked on the tray which is in a forward projected posture. In the same manner as recording sheets housed in the recording sheet cassette 17, the recording sheets stacked on the tray 18 are supplied to the printer 31 to be subjected to a printing process, and then discharged from the recording sheet discharge port 19.

2. Electrical Configuration of the Facsimile Apparatus

Figure 2:
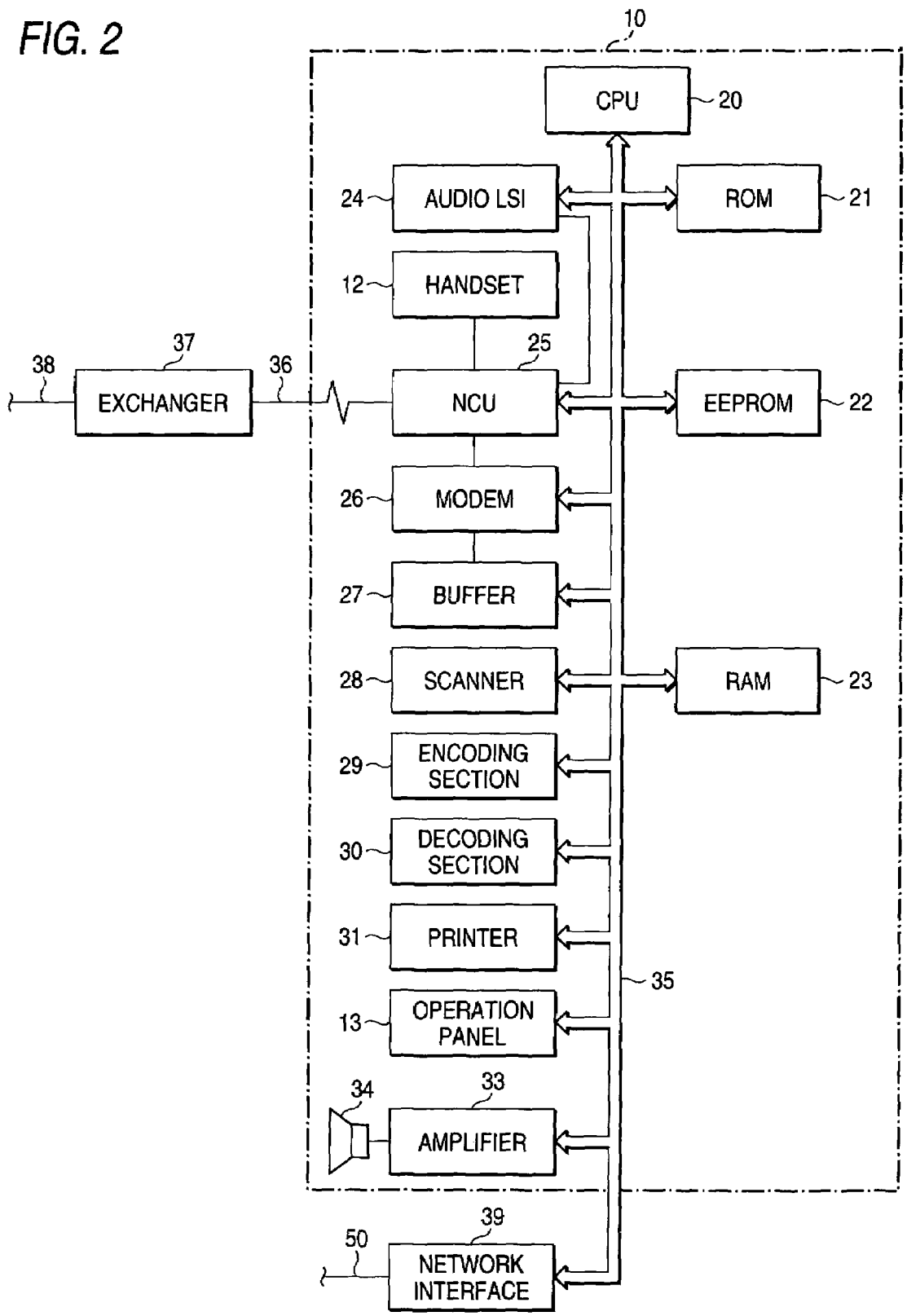
FIG. 2 is a block diagram showing the electrical configuration of the facsimile apparatus.

FIG. 2 is a block diagram showing the electrical configuration of the facsimile apparatus 10. The facsimile apparatus 10 comprises a CPU 20, a ROM 21, an EEPROM 22 which is a nonvolatile memory, a RAM 23, an audio LSI 24, a network control unit (hereinafter, abbreviated to "NCU") 25, a modem 26, a buffer 27, the scanner 28, an encoding section 29, a decoding section 30, the printer 31, the operation panel 13, an amplifier 33, a speaker 34, and a network I/F 39. These portions are connected to one another via a bus line 35.

The NCU 25 controls the network so that the facsimile apparatus 10 is connected to a telephone line 36 via the NCU 25. The NCU 25 receives signals transmitted from an exchanger 37, such as a call signal, and a telephone number of an opposite telephone, and, in response to an operation applied to the buttons disposed on the operation panel 13, transmits a dial signal in a calling process to the exchanger 37. Moreover, the NCU 25 transmits and receives an analog audio signal in a speech process.

In accordance with various signals transmitted and received via the NCU 25, the CPU 20 controls the various portions which are connected to one another via the bus line 35 so as to perform a facsimile operation and a telephone operation, i.e., data communication. As described later, the CPU functions also as determining section, controlling section, and managing section.

The ROM 21 is an unrewritable memory which stores control programs to be executed by the facsimile apparatus 10, and the like. The EEPROM is a nonvolatile memory which is rewritable. Data stored in the EEPROM 22 are retained even after the power supply of the facsimile apparatus 10 is turned off. The RAM 23 is a memory which temporarily stores various data in executions of the operations of the facsimile apparatus 10, and stores data such as image data and audio data. The RAM 23 has a battery backup function, so that data stored in the RAM 23 are retained for a predetermined time period after the power supply of the facsimile apparatus 10 is turned off.

The audio LSI 24 performs processes of converting an analog audio signal received by the NCU 25 to a digital audio signal, and converting a digital audio signal generated inside the facsimile apparatus 10 to an analog audio signal and outputting the analog audio signal to the NCU 25 and the speaker 34 (the amplifier 33).

The modem 26 transmits modulated image information and demodulates transmitted image information, and transmits and receives various procedure signals for controlling transmission. The buffer 27 temporarily stores a data including coded image information which is transmitted and received between the facsimile apparatus and an opposite communication apparatus (for example, a facsimile apparatus). The scanner 28 reads an original inserted into the original insertion port 15 to form an image data.

The encoding section 29 encodes image data which is read by the scanner 28. By contrast, the decoding section 30 reads out image data stored in the RAM 23, and converts (decodes) the image data to an image data. The decoded data is subjected to a converting process which will be described later, and then printed onto a recording sheet by the printer 31.

The operation panel 13 enables the user to perform various operations so as to perform operations such as those of setting the facsimile apparatus 10. The amplifier 33 is used for driving the speaker 34 connected to the amplifier 33, thereby outputting a ringing tone and voices. The network I/F (interface) 39 is used for realizing communication via a LAN 50, and transmits and receives, for example, an electronic mail.

The thus configured facsimile apparatus 10 is connected to the telephone line 36 via the NCU 25. The telephone line 36 is connected to the exchanger 37. The exchanger 37 is connected to another exchanger 37 via a telephone line 38. The other exchanger 37 is connected to other apparatuses such as the opposite communication apparatus via telephone lines.

3. Operation of the Facsimile Apparatus

The operation of the facsimile apparatus 10 of the embodiment will be described with reference to FIGS. 3 to 6 while focusing on the contents of the control by the CPU 20. In the embodiment, the received data from the opposite communication apparatus is compressed by data compression software to be formed as modulation codes. The compression in the embodiment is performed by MH (Modified Huffman) coding. Alternatively, MR (Modified READ) coding or MMR coding may be employed in the compression.

(1) Flow of Process From Received Data to Image Data

Figure 3:
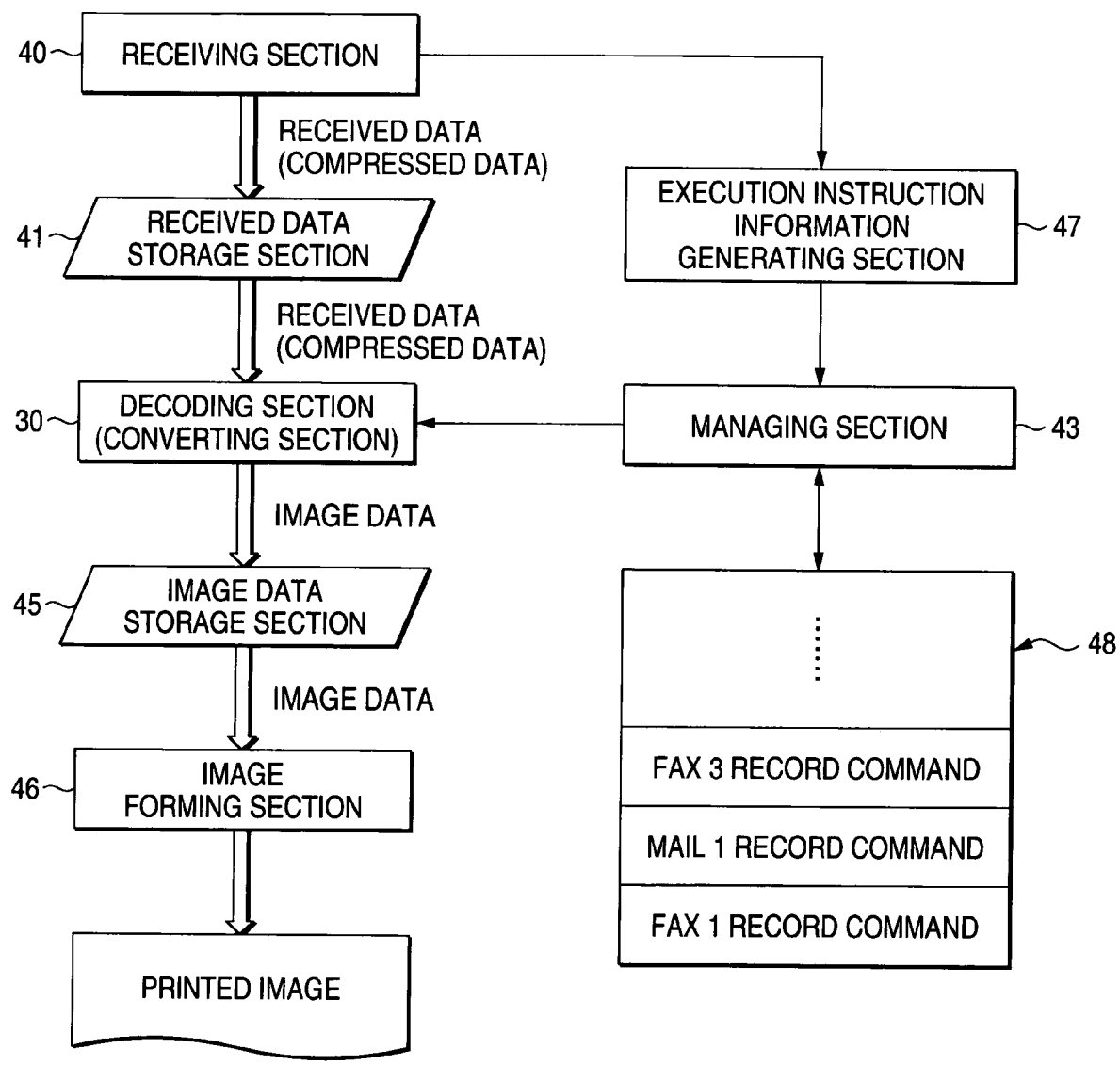
FIG. 3 is a functional block diagram showing the flow of data processing.

FIG. 3 is a functional block diagram showing the flow of the process from a received data to an image data.

First, received data (compressed data) which are received by receiving section 40 (the NCU 25) and demodulated by the modem 26 are temporarily accumulated in the buffer 27. The received data accumulated in the buffer 27 are transferred to received data storage section 41 (for example, an area for a received data in the RAM 23) to be stored into the received data storage section 41.

If execution instruction information (execution instruction command) is sent from managing section 43, a received data corresponding to the execution instruction information is read out, and then converted to an image data (bitmap data) by the decoding section 30 (converting section), and the image data is stored into image data storage section 45 (an area for an image data in the RAM 23). If a print start command is issued, the image data is read out by image forming section 46 (the printer 31) to be subjected to an image forming process (printed out).

In FIG. 3, "47" denotes execution instruction information generating section which generates execution instruction information (execution instruction command) corresponding to the received data received by the NCU 25 and transmits the information to the managing section 43. The managing section 43 manages the order of processes (records) of various received data received in facsimile reception and mail reception, and stores execution instruction information from the execution instruction information generating section 47 into execution instruction information storage section 48 while ranking the information in accordance with, for example, the order of receptions. In the figure, execution instruction command 1 corresponding to a received data received in facsimile reception, execution instruction command 1 corresponding to a next received data received in mail reception, and execution instruction command 2 corresponding to a further received data received in facsimile reception are stored in this order to constitute a queue. The managing section 43 gives the sets of execution instruction information in this order to the decoding section 30, so that recording processes (converting processes, printing processes) of received data respectively corresponding to the execution instruction information are sequentially executed. In the case where plural process requests are made, namely, a queue is produced, and the execution instruction information generating section 47 waits until the processes are performed and the turn comes.

(2) Specific Contents of Processes

Figure 5:
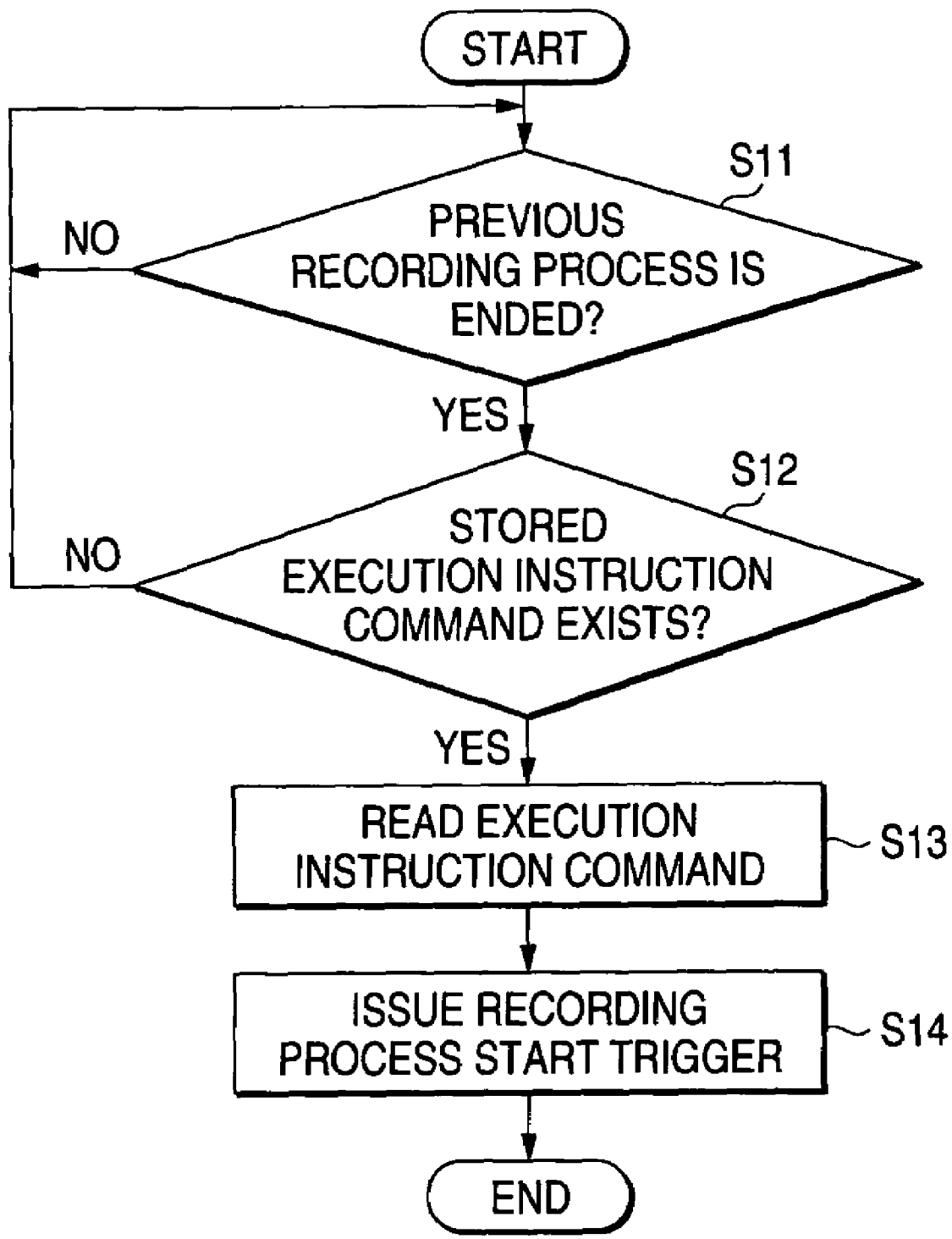
FIG. 5 is a flowchart showing a routine of managing a record request.
Figure 6:
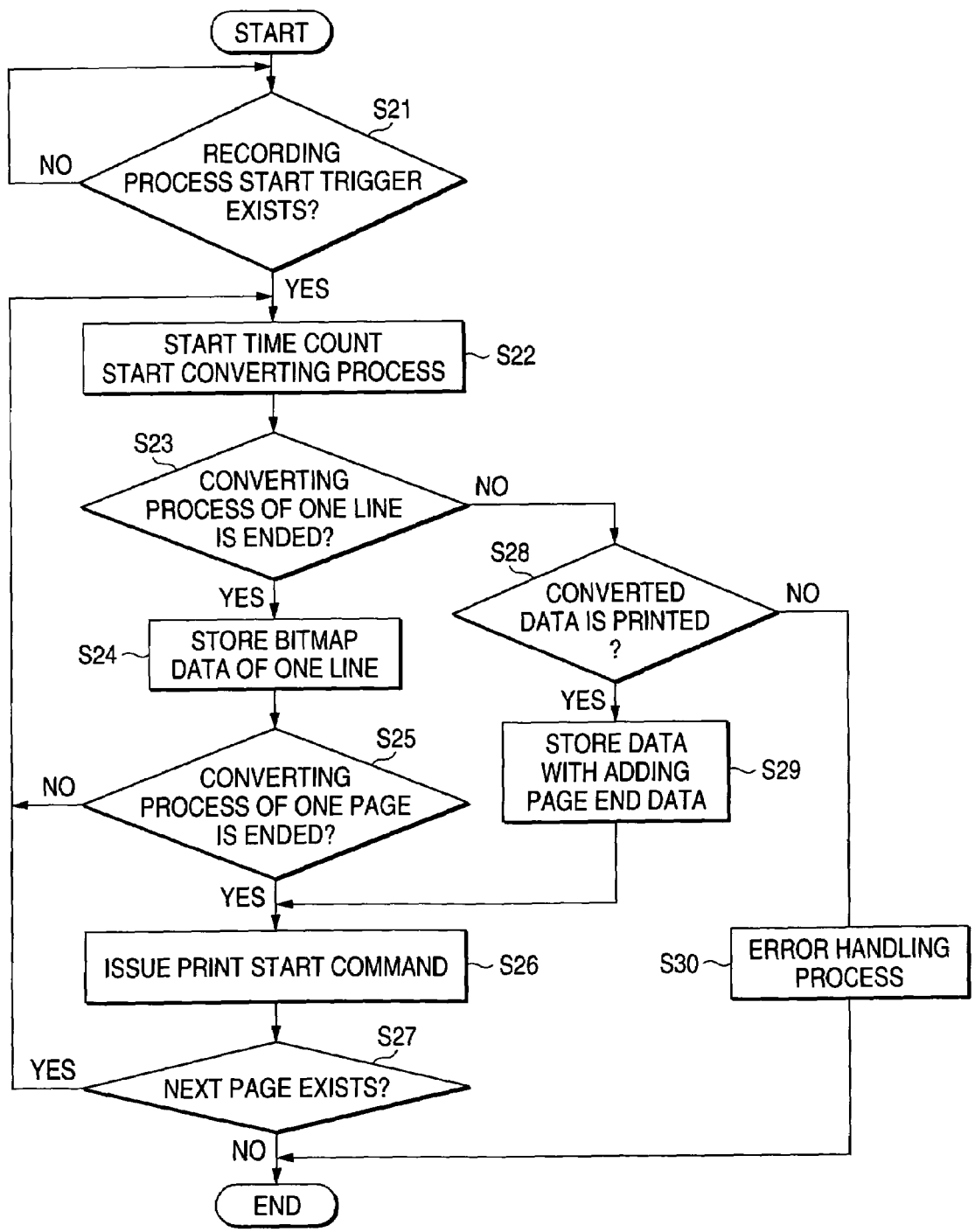
FIG. 6 is a flowchart showing a routine of record processing.

Next, the contents of the processes will be specifically described with reference to FIGS. 4 to 6.

A. Process of Receiving Data

Figure 4:
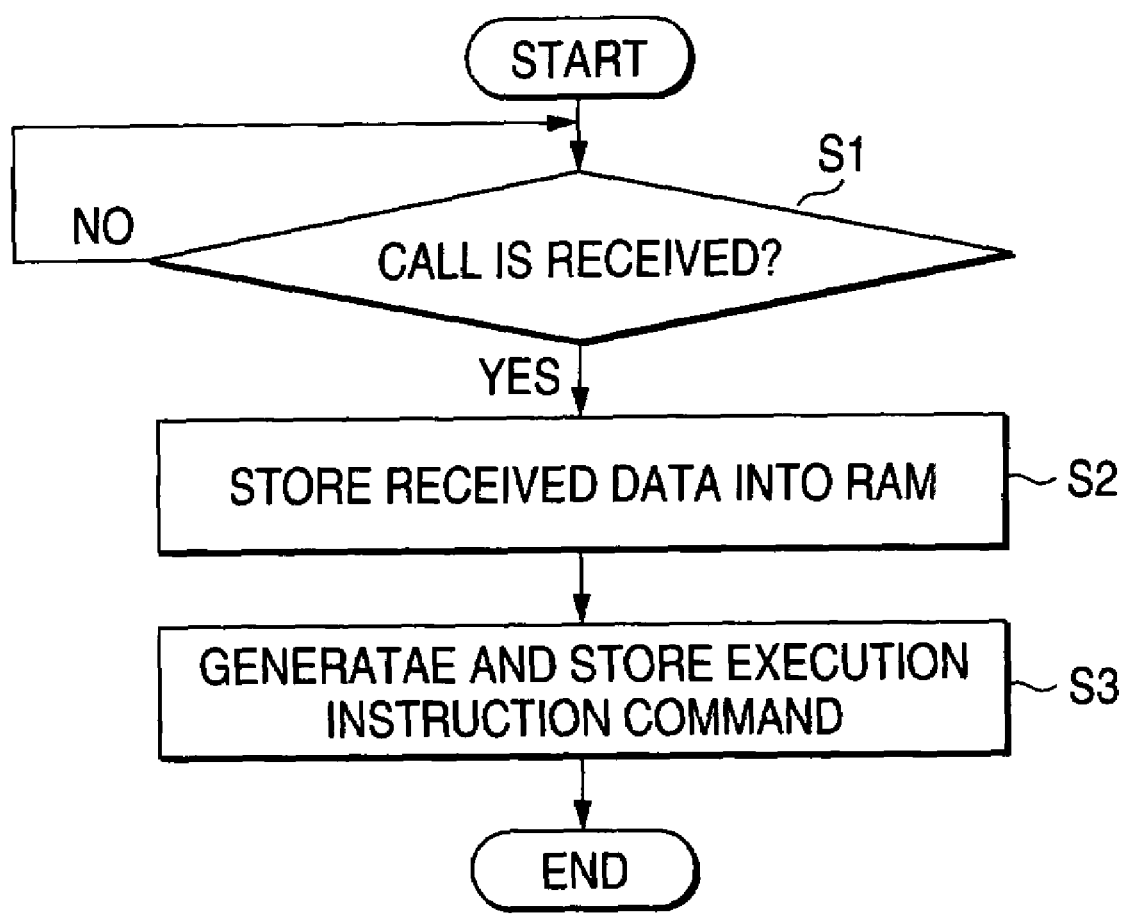
FIG. 4 is a flowchart showing a reception routine.

When a data is to be received from an opposite communication apparatus, the CPU 20 executes the control shown in the flowchart of FIG. 4. In step S1, the control is in a waiting state until the CPU receives a signal indicative of a call from the NCU 25. When a signal indicative of a call is received ("Y" in step S1), the NCU 25 receives a data, the received data is demodulated by the modem 26, and the received data is then stored via the buffer 27 into the received data area of the RAM 23 (step S2).

An execution instruction command corresponding to the received data is then generated. The execution instruction command is stored into, for example, an execution instruction area of the RAM 23 (step S3). At this time, the execution instruction command and the received data are correlated with each other with using a common ID.

The above-mentioned process is executed each time the NCU 25 receives a data. The received data is stored into the received data area of the RAM 23, and an execution instruction command corresponding to the received data is stored into the execution instruction area of the RAM 23 while being ranked in accordance with, for example, the reception rank of the corresponding received data (see FIG. 3).

B. Process of Managing Record Request

The CPU 20 functions also as managing section for managing a process of recording various received data received by the NCU 25. Specifically, the CPU executes the control shown in the flowchart of FIG. 5. First, it is determined whether the system is in a recordable state or not. Namely, it is detected in step S11 whether a process (in the embodiment, a process of converting a received data) based on the last execution instruction command is ended or not. If the process is not ended, the control is in a waiting state until the process is ended.

When the process is ended ("Y" in step S11), it is checked in step S12 whether an execution instruction command(s) exists in the execution instruction area of the RAM 23 or not. If an execution instruction command(s) exists in the execution instruction area of the RAM 23 ("Y" in step S12), an execution instruction command which has the highest rank among the commands is read out, and a trigger for starting a process of recording the received data which is correlated with the execution instruction command by the common ID is issued (steps S13 and S14).

C. Recording Process

The CPU 20 functions also as determining section in the invention. Specifically, the CPU executes the control shown in the flowchart of FIG. 6. In step S21, the control waits until the recording process start trigger is issued. When the recording process start trigger is issued ("Y" in step S21), a time counting process is started in step S22, and instructions are given to the decoding section 30 to start the converting process by the decoding section 30. The converting process by the decoding section 30 corresponds to "converting process" in the invention. In the embodiment, a process of converting a data which is compressed by MH coding to a bitmap data is performed.

In step S23, it is determined whether or not the converting process on a received data of one line (corresponding to a scan line) is ended within a reference time period after the converting process is started. In the bitmap data after conversion (development), a line end data is added to the last of a data of one line, and a page end data is added to the last of a data of one page.

In the embodiment, it is determined whether or not the line end data can be detected within the reference time period after the converting process for one line is started. The reference time period is set to a time period according to that required for normally converting a data of one line (for example, a time period which is slightly longer than the normal converting process time period is set as the reference time period). The reference time period depends on the amount of a received data, the compression format, the processing speed of the compression software, the resolution of image data, and the like, and can be previously obtained by experiments, calculations, or the like.

If the converting process on a received data of one line is normally ended within the reference time period ("Y" in step S23), the bitmap data of one line is stored in step S24 into an image data area of the RAM 23.

The above process is executed sequentially on each of lines. When the converting process on a received data of one page is normally ended ("Y" in step S25), the print start command is issued to the printer 31 (step S26). Then, an image is printed onto a recording sheet by the printer 31 on the basis of the bitmap data of one page stored in the image data area of the RAM 23. If there is a received data of the next page, the same process is repeated (step S27). When the process of converting the received data of all pages is ended, the execution instruction command corresponding to the received data is deleted from the execution instruction area of the RAM 23.

By contrast, if the converting process on a data of one line is not ended even after elapse of the reference time period ("N" in step S23), it is considered that an anomaly (for example, corruption of a compressed data) is caused in the converting process for some reasons. In step S28, therefore, it is determined whether or not the apparatus is set so as to perform a process of printing a converted data. If the apparatus is set so as to perform a process of printing a converted data ("Y" in step S28), a page end data is added to the last of a bitmap data of a line on which the converting process is normally performed, and the bitmap data is then stored into the image data area of the RAM 23 (step S29). Then, the print start command is issued in step S26, and an image of a portion of one page extending to the last one of the lines on which the converting process is normally performed is recorded onto a recording sheet. At this time, a message that an image subsequent to the anomalous line is not printed is displayed on the LCD 14.

If the apparatus is not set so as to perform a process of printing a converted data ("N" in step S28), an error handling process is performed in step S30. Specifically, the following processes are performed depending on preset contents.

(a) The execution instruction command corresponding to the received data in which the anomaly occurs in the converting process is deleted from the execution instruction area of the RAM 23, and a message indicative of this deletion is displayed on the LCD 14. As a result, the converting process on the received data in which the anomaly occurs is ended, a trigger for starting a recording process on the basis of an execution instruction command of the second highest rank is issued, and a converting process on a received data corresponding to it is executed.

When an execution instruction command in the RAM 23 is deleted, also an image data in the RAM 23 corresponding to the execution instruction command may be deleted. According to the configuration, it is possible to prevent the storage area of the RAM 23 from being wastefully used by useless data.

(b) The execution instruction command corresponding to the received data in which the anomaly occurs in the converting process is rearranged to the lowest rank in the execution instruction area of the RAM 23, and a message indicative of this rearrangement is displayed on the LCD 14.

As a result, the converting process on the received data in which the anomaly occurs is ended, a trigger for starting a recording process on the basis of an execution instruction command of the second highest rank is issued, and a converting process on a received data corresponding to it is executed.

(c) After the error handling process (a) or (b), information related to the received data is extracted, the extracted information is written into, for example, the EEPROM 22, and a message that an anomaly occurs is displayed on the LCD 14. Alternatively, the extraction result related to the received data may be printed (output) on a recording sheet, or may be automatically transmitted to the manufacturer.

In a received data, information such as the data size of one page, the compression method, and the resolution is recorded in the header of each page. When such information is extracted, for example, the information is useful to locate the cause of the anomaly by the manufacturer.

4. Effects of the Embodiment

In the embodiment, as described above, when an anomaly occurs in a converting process, the converting process on the received data (a received data corresponding to FAX 1 RECORD COMMAND in FIG. 3) is ended, and the control is then transferred to a process on a received data which is subsequently received (a compressed data corresponding to MAIL 1 RECORD COMMAND). Therefore, it is possible to perform converting and printing processes on received data which are subsequently received.

In the error handling process (a), the execution instruction command corresponding to a received data which has been once determined as anomalous is deleted from the execution instruction area of the RAM 23, and therefore it is possible to prevent a situation where a process of converting the same received data is again executed and an anomaly is repeated, from occurring.

In the embodiment, with respect to a received data in which an anomaly occurs, an image portion extending to the data portion in which the converting process is normally performed is printed, and hence it is possible to avoid a situation where a printing process is not performed even in the case where the anomaly occurs in a line which exerts little influence on the image quality and the like.

Embodiment 2

Figure 7:
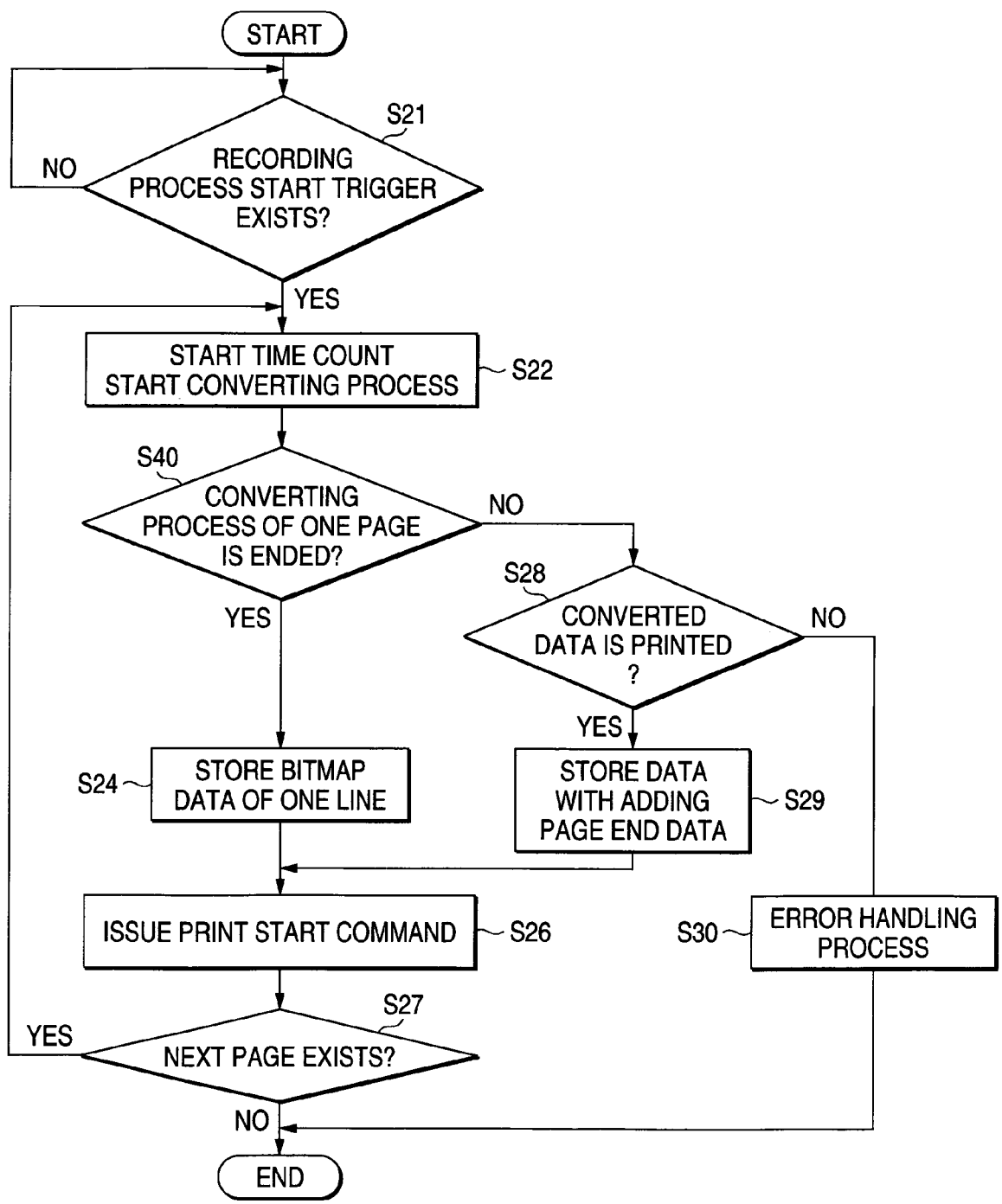
FIG. 7 is a flowchart showing a routine of record processing in Embodiment 2.

FIG. 7 shows Embodiment 2. The embodiment is identical with Embodiment 1 except that an anomaly in a converting process is performed in unit of page. Therefore, the components are denoted by the same reference numerals, duplicate description will be omitted, and only different portions will be described.

In the embodiment, as shown in FIG. 7, it is determined in step S40 whether or not the converting process on a received data of one page is ended within a reference time period. The reference time period is set to a time period according to that required for normally converting a data of one page (for example, a time period which is slightly longer than the normal converting process time period is set as the reference time period). The reference time period also depends on the amount of a received data, the compression format, the processing speed of the compression software, the resolution of image data, and the like, and can be previously obtained by experiments, calculations, or the like.

According to the configuration, the process burden of the CPU can be reduced as compared with the case where the anomaly detection is performed in each line as in Embodiment 1. However, the configuration in which the anomaly detection is performed in each line has an effect that an anomaly can be detected in a relatively early stage and subsequent received data can be rapidly processed.

Other Embodiments

The invention is not restricted to the embodiments which have been described by the foregoing description and drawings. For example, also the following embodiments fall within the technical scope of the invention, and various other modifications can be made without departing from the spirit of the invention.

(1) In the embodiments described above, the converting process in the invention is performed by converting a compressed data to an image data. Alternatively, the converting process may be performed by converting the resolution (for example, 16 dots/mm→8 dots/mm), converting the document structure (for example, TIF.1→TIF.0), or combining these conversions).

(2) A received data in which an anomaly occurs may be deleted from the RAM 23, whereby the storage capacity of the RAM is ensured.

(3) In the embodiments described above, the time period which elapses before a line end data is detected in each line, or that which elapses before a page end data is detected in each page is used. Alternatively, an anomaly may be detected based on whether the amount of a data which is converted within a reference time period reaches a predetermined data amount or not. The predetermined data amount is a data amount of one line or one page in the case where the converting process is normally performed.

(4) In the embodiments described above, the configuration may be employed where, in the error handling process, a message is displayed on the LCD 14 is employed as informing section. Alternatively, a configuration where a dedicated lamp is lit, or a voice message is output via the speaker 34 may be employed.

(5) In the embodiments described above, a configuration where a received data in which an anomaly occurs is not deleted but stored into the EEPROM 22. According to the configuration, for example, the manufacturer can analyze the received data to locate the cause of the anomaly.

(6) In the embodiments described above, data such as a received data, an image data, and an execution instruction command are stored in the RAM 23. Alternatively, at least one of such data may be stored in the EEPROM 22.

(7) In the embodiments described above, a received data which is to be converted to an image data is received via the NCU 25. Alternatively, a received data may be received via the network I/F 39, and the above-described processes may be performed on the received data.

In the image forming apparatus, the received data is compressed data, and the converting section converts the compressed data to bitmap data.

Thus, it is determined whether or not an anomaly occurs in the converting process of converting the compressed received data to bitmap data. If anomaly is detected, the converting process can be ended and transferred to a process of converting a subsequent received data.

In the image forming apparatus, the communication network is a telephone line, and the image forming apparatus is a facsimile apparatus.

In a facsimile apparatus, when an anomaly occurs in a process of converting a certain received data and the following process is stopped, also a received data which is thereafter transmitted from an opposite communication apparatus cannot be subjected to processes such as printing. Such a received data which is transmitted from a transmitting apparatus may contain an urgent matter. In a facsimile apparatus, this causes a serious problem. Therefore, it is very effective to apply the invention to the facsimile apparatus as in this configuration.

In the image forming apparatus, the determining section determines that an anomaly occurs in the converting process of the converting section if a process period of data per unit of page of an image or data per unit of scan line in the converting process is equal to or longer than a reference period.

Thus, the process period of converting the received data is determined depending on whether or not the process period of data per unit of page or data per unit of scan line is equal to or longer than the reference period. Regardless of the contents of the converting process, therefore, the period of the converting process in a normal state is, for example, measured and the reference period is set based on the measured time. As a result, an anomaly in the converting process can be detected by a relatively simple process.

In the image forming apparatus, the controlling section has a managing section that generates a plurality of execution instruction information which respectively correspond to a plurality of the received data received by the receiving section, and sends the plurality of the execution instruction information to the converting section in a predetermined order, the converting section performs the converting process of the received data corresponding to each execution instruction information in the order of the execution instruction information sent from the managing section, and the managing section deletes execution instruction information corresponding to received data to be subjected to a converting process determined at least one time as anomalous by the determining section.

Thus, the execution instruction information corresponding to the received data which has been once determined as anomalous is deleted by the managing section. Therefore, it is possible to prevent a situation, where an anomaly with respect to the identical received data repeatedly occurs in a converting process, from occurring.

In the image forming apparatus, received data to be subjected to a converting process determined as anomalous by the determining section is erased from the storage section.

The term "erase" includes configurations such as that in which a received data to be subjected to a converting process which is determined as anomalous is deleted from the storage section, and that in which such a received data is erased by overwriting another received data.

Thus, the received data to be subjected to a converting process determined as anomalous by the determining section is erased from the storage section. Therefore, it is possible to avoid a situation where a received data which cannot be normally converted remains to be stored in the storage section and occupies the storage capacity of the storage section.

In the image forming apparatus, the storage section has a nonvolatile memory, received data to be subjected to a converting process determined as anomalous by the determining section is stored into the nonvolatile memory.

Thus, the received data to be subjected to a converting process determined as anomalous is stored into the nonvolatile memory. Therefore, for example, the manufacturer can analyze the received data stored in the nonvolatile memory to locate the cause of the anomaly.

In the image forming apparatus, even if the determining section determines that an anomaly occurs in the converting process, the image forming section forms an image based on image data which is normally converted before the anomaly occurs.

In the case where most of one received data is normally converted to an image data and an anomaly occurs in a process of converting a last portion of the received data, it is preferable to form even only an image portion corresponding to the image data obtained by the normal converting process. Therefore, an image is formed on the basis of the normally converted image data.

The image forming apparatus further has an extracting section that extracts information regarding received data to be subjected to a converting process determined as anomalous by the determining section; and an outputting section that outputs the information extracted by the extracting section.

The term "information regarding received data" includes a data size of the received data, a data size after the converting process, and the like.

Thus, information regarding received data to be subjected to a converting process determined as anomalous is extracted, and the information is output. Therefore, it is possible to locate the cause of the anomaly on the basis of the information.

What is claimed is:

1. An image forming apparatus comprising:
   a receiving section that receives data regarding an image transmitted through a communication network;
   a storage section that stores the received data received by the receiving section;
   a converting section that reads out the received data stored in the storage section and performs a converting process of converting the received data to image data;
   an image forming section that forms an image on a recording medium based on the image data converted by the converting section;
   a determining section that determines whether or not an anomaly occurs in the converting process of the converting section; and
   a controlling section that controls the converting section to terminate the converting process determined by the determining section that an anomaly occurs, and to perform a subsequent converting process of subsequent data if the receiving section receives the subsequent data,
   wherein the determining section determines that an anomaly occurs in the converting process of the converting section if a process period of data per unit of page of an image or data per unit of scan line in the converting process is equal to or longer than a reference period.

2. The image forming apparatus according to claim 1, wherein the received data is compressed data, and the converting section converts the compressed data to bitmap data.

3. The image forming apparatus according to claim 1, wherein the communication network is a telephone line, and the image forming apparatus is a facsimile apparatus.

4. The image forming apparatus according to claim 1, wherein
the controlling section comprises a managing section that generates a plurality of execution instruction information which respectively correspond to a plurality of the received data received by the receiving section, and sends the plurality of the execution instruction information to the converting section in a predetermined order,
the converting section performs the converting process of the received data corresponding to each execution instruction information in the order of the execution instruction information sent from the managing section, and
the managing section deletes execution instruction information corresponding to received data to be subjected to a converting process determined at least one time as anomalous by the determining section.

5. The image forming apparatus according to claim 1, wherein received data to be subjected to a converting process determined as anomalous by the determining section is erased from the storage section.

6. The image forming apparatus according to claim 1, wherein the storage section has a nonvolatile memory, and wherein received data to be subjected to a converting process determined as anomalous by the determining section is stored into the nonvolatile memory.

7. The image forming apparatus according to claim 1, wherein even if the determining section determines that the anomaly occurs in the converting process, the image forming section forms an image based on image data which is normally converted before the anomaly occurs.

8. The image forming apparatus according to claim 1, further comprising:
an extracting section that extracts information regarding received data to be subjected to a converting process determined as anomalous by the determining section; and
an outputting section that outputs the information extracted by the extracting section.

9. The image forming apparatus according to claim 1, wherein when the determining section determines that the anomaly occurs in the converting process, the determining section determines whether the image forming apparatus is set to perform printing of the image data, and if the image forming apparatus is not set to perform printing of the converted data, a message is displayed indicating that the anomaly is occurring.

10. Amended) An image forming apparatus, comprising:
a communication unit that receives data transmitted through a communication network;
a memory that stores the data received by the communication unit;
a controller that reads out the data stored in the memory and performs a converting process of converting the data to an image data; and
an image forming section that forms an image on a recording medium based on the image data converted by the controller,
wherein the controller further determines whether or not an anomaly occurs during the converting process, terminates the converting process determined that an anomaly occurs, and performs a subsequent converting process of subsequent data if the communication unit receives the subsequent data, and
wherein the determining section determines that an anomaly occurs in the converting process of the converting section if a process period of data per unit of page of an image or data per unit of scan line in the converting process is equal to or longer than a reference period.

11. The image forming apparatus according to claim 10, wherein when the determining section determines that the anomaly occurs in the converting process, the determining section determines whether the image forming apparatus is set to perform printing of the image data, and if the image forming apparatus is not set to perform printing of the converted data, a message is displayed indicating that the anomaly is occurring.

12. An image forming apparatus comprising:
a receiving section that receives data regarding an image transmitted through a communication network;
a storage section that stores the received data received by the receiving section;
a converting section that reads out the received data stored in the storage section and performs a converting process of converting the received data to image data;
an image forming section that forms an image on a recording medium based on the image data converted by the converting section;
a determining section that determines whether or not an anomaly occurs in the converting process of the converting section; and
a controlling section that controls the converting section to terminate the converting process determined by the determining section that an anomaly occurs, and to perform a subsequent converting process of subsequent data if the receiving section receives the subsequent data,
wherein the storage section has a nonvolatile memory, and
wherein received data to be subjected to a converting process determined as anomalous by the determining section is stored into the nonvolatile memory.

13. The image forming apparatus according to claim 12, wherein the determining section determines that an anomaly occurs in the converting process of the converting section if a process period of data per unit of page of an image or data per unit of scan line in the converting process is equal to or longer than a reference period.

14. The image forming apparatus according to claim 12, wherein
the controlling section comprises a managing section that generates a plurality of execution instruction information which respectively correspond to a plurality of the received data received by the receiving section, and sends the plurality of the execution instruction information to the converting section in a predetermined order,
the converting section performs the converting process of the received data corresponding to each execution instruction information in the order of the execution instruction information sent from the managing section, and
the managing section deletes execution instruction information corresponding to received data to be subjected to a converting process determined at least one time as anomalous by the determining section.

15. The image forming apparatus according to claim 12, wherein received data to be subjected to a converting process determined as anomalous by the determining section is erased from the storage section.

16. The image forming apparatus according to claim 12, wherein the storage section has a nonvolatile memory, wherein received data to be subjected to a converting process determined as anomalous by the determining section is stored into the nonvolatile memory.

17. The image forming apparatus according to claim 12, wherein even if the determining section determines that an anomaly occurs in the converting process, the image forming section forms an image based on image data which is normally converted before the anomaly occurs.

18. The image forming apparatus according to claim 12, further comprising:

an extracting section that extracts information regarding received data to be subjected to a converting process determined as anomalous by the determining section; and an outputting section that outputs the information extracted by the extracting section.

19. The image forming apparatus according to claim 12, wherein when the determining section determines that the anomaly occurs in the converting process, the determining section determines whether the image forming apparatus is set to perform printing of the image data, and if the image forming apparatus is not set to perform printing of the converted data, a message is displayed indicating that the anomaly is occurring.

* * * * *